United States Patent
Olbrich et al.

[11] Patent Number: 6,074,304
[45] Date of Patent: Jun. 13, 2000

[54] DETACHABLE COUPLING MEANS

[75] Inventors: Otto Olbrich, Taufkirchen; Peter Thiemann, Munich, both of Germany

[73] Assignee: Oce Printing Systems GmbH, Poing, Germany

[21] Appl. No.: 08/955,967

[22] Filed: Oct. 22, 1997

[30]     Foreign Application Priority Data

Oct. 22, 1996  [DE]  Germany .......................... 196 43 630

[51] Int. Cl.[7] .................................... F16D 1/12
[52] U.S. Cl. ................. 464/160; 192/48.92; 464/901
[58] Field of Search ................ 192/48.92; 404/30, 404/160, 185, 901

[56]              References Cited

U.S. PATENT DOCUMENTS

| | | | |
|---|---|---|---|
| 2,061,288 | 11/1936 | Murray | 192/48.92 |
| 2,288,425 | 6/1942 | Spindle . | |
| 3,165,183 | 1/1965 | Clements | 192/48.92 |
| 3,191,285 | 6/1965 | Shamie . | |
| 4,284,183 | 8/1981 | Brisabois et al. | 192/48.92 |
| 4,501,169 | 2/1985 | Stilin | 192/48.92 |
| 4,693,351 | 9/1987 | Adolfsson | 192/48.02 |
| 5,404,976 | 4/1995 | Lihrmann | 192/48.92 |
| 5,529,159 | 6/1996 | Troccaz | 192/48.02 |
| 5,642,796 | 7/1997 | Tabe | 192/48.92 |

FOREIGN PATENT DOCUMENTS

| | | |
|---|---|---|
| 1 165 942 | 3/1964 | Germany . |
| 26 53 141 | 12/1977 | Germany . |
| 1 557 268 | 12/1979 | United Kingdom . |

*Primary Examiner*—Terry Lee Melius
*Assistant Examiner*—Greg Binda
*Attorney, Agent, or Firm*—Hill & Simpson

[57]              ABSTRACT

A detachable coupling is provided for transmitting mechanical rotation from a driving shaft to a driven shaft which extend substantially coaxially with one another. A spring apparatus is provided in the detachable coupling which acts axially and is rigid in the direction of rotation. The spring apparatus presses wedge-shaped catch slots of the detachable coupling in an axial direction against catch pins in the shafts.

4 Claims, 3 Drawing Sheets

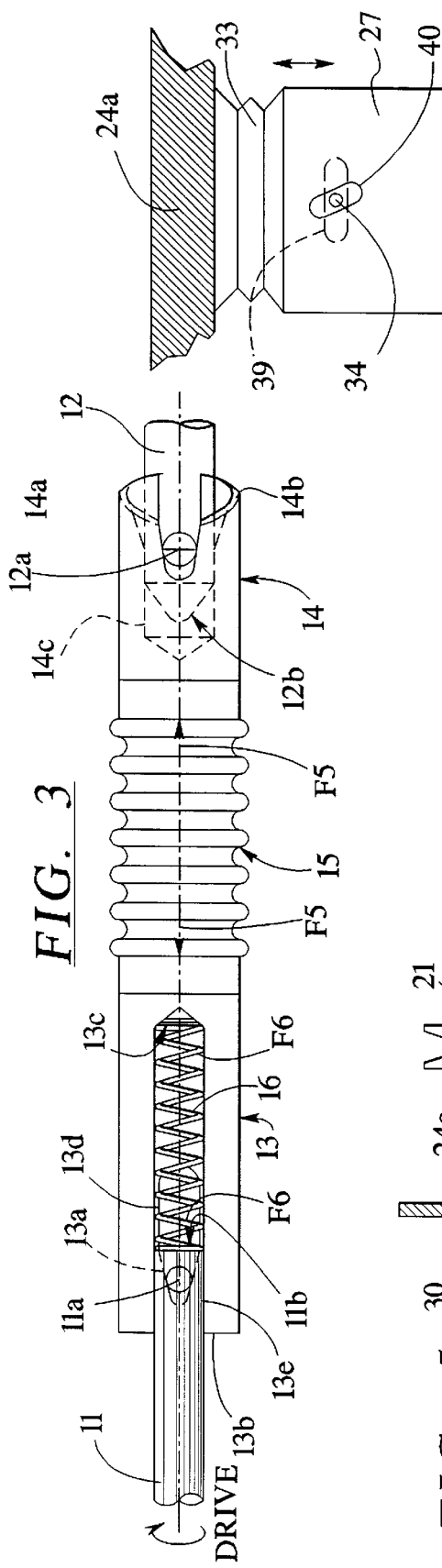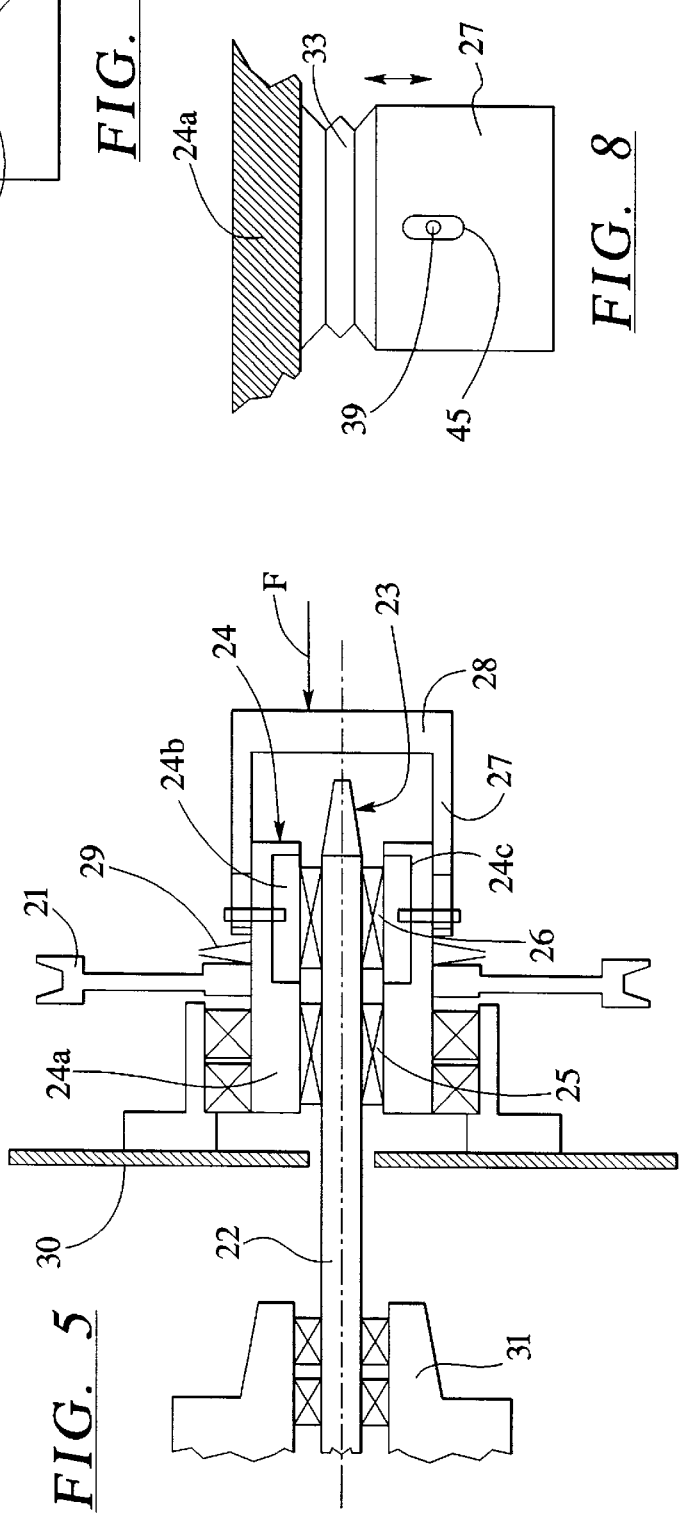

DETACHABLE COUPLING MEANS

BACKGROUND OF THE INVENTION

1. Field of the Invention

The present invention relates generally to a detachable coupling for transmitting mechanical rotation from a driving shaft to a driven shaft which are axially aligned with one another.

2. Description of the Related Art

In technological apparatuses, it is often necessary to transmit a rotational motion without play from a drive which is installed in an apparatus to a pluggable subassembly. The engagement of the coupling and the detachment of the coupling should occur automatically without additional operational efforts.

In machines, it is often necessary for maintenance and operational purposes to be able to open the machines and to separate the parts of the machines. Detachable transmission elements are required as a standard for transmitting signals as well as for transmitting electrical and mechanical power. The couplings are required to be able to compensate for minor displacements of the subassemblies in the base apparatus.

An example of such a subassembly is a fixing station of electrophotographic singlesheet printer with a high printer output. In the fixing station, the paper runs between heated rollers. This fixes the toner on the paper. The fixing station must be easily removable by the user so that, for example, a paper jam can be cleared. The drive motor is advantageously built fixed in the housing of the printer since a step-down gear system must be connected between the motor and the fixing station due to the low rotational speed of the fixing station rollers.

A known apparatus which meets the requirement of easily coupling and detaching is a dog clutch, or coupling, as shown in FIG. 1. The functional principles of the coupling are explained here and after. A shaft end 2 of an element which is to be driven (such as a shaft in the fixing station) protrudes from a fixing station and is provided with a catch pin 2a. As the fixing station approaches the dog clutch 4 in an axial direction, the catch pin 2a can have an arbitrary angular position to a catch slot 4a. If the catch pin 2a does not align with the catch slot 4a when the shaft end 2 is advanced axially, it meets a helical surface 4b, which compresses the spring 6 which bears against an end 1b of the drive shaft and pushes the dog clutch over the drive shaft 1. When the drive rotates the sleeve 3, the catch pin 2a slides on the helical surface and after a partial rotation springs into the illustrated catch position. Another catch pin 1a which slides into a catch slot 3a of the dog clutch when the sleeve 3 is pushed along the drive shaft 1, transmits the rotational motion from a universal joint 5 which compensates for errors in alignment between the sleeve 3 and the shaft end 2. However, a problem in this arrangement is that both the catch pins 2a and 1a and the universal joint 5 must have some play to provided axial mobility. Given fluctuations in the drive torque, this play can lead to fluctuations in the rotational motion and, thus, to distortions in the print image produced by the fixing station.

Uniform rotational velocity is required for the fixing station because long papers are simultaneously positioned in the fixing station and in the transfer printing apparatus. Since the paper is clamped between the fixing rollers much more strongly in the fixing station than it is held in the transfer printing apparatus, any fluctuations in the rotational speed in the fixing station will cause the above-mentioned distortions in the print image.

To reduce torsional play, the known apparatuses use wedge-shaped grooves to improve performance, the wedge-shaped grooves being made free of play by the application of forces which act axially thereon. However, the problem is that an axial resilience is necessary which must also be able to transmit torque. A spring of this type which has sufficient torsional rigidity is not able to provide a sufficient length compensation. The length compensation is necessary, on one hand, to prevent destruction of the machine in case of an inadvertent meeting of the wedge-shaped groove teeth and, on the other hand, to avoid the high costs of providing a narrow position tolerance of the components in the axial direction. A further problem is presented by the application of axial forces which also require a corresponding stopping means.

A further known type of construction for couplings as described above uses a freewheel with a plug-in hub which acts at one side. However, an essential problem is that the torque transmission, which is effective only in one direction of rotation, does not offer sufficient synchronization in low-friction systems and upon the occurrence of varying torque superpositions, such as during run-in moments or stresses in the drive train.

In a coupling means as previously known, a uniform transmission of the rotational motion is not always ensured. In mechanical power couplers, the problems lie in the torsional play that arises due to joints that compensate for axial displacement and/or for length compensating grooves provided for axial resilience. This has a particularly disadvantageous effect, especially in connection with stepped motor drives and in the case of high synchronization demands such as in transfer printing processes in the above-described electrophotographic printer.

SUMMARY OF THE INVENTION

An object of the present invention is to provide a coupling which is free of torsional play.

According to a first aspect of the present invention, this object is achieved by a detachable coupling means of the type described above which has a first diametrically extending catch pin provided on a first shaft and a second diametrically extending catch pin provided on the second shaft at the respective terminal regions of the two shafts. The first shaft is, for example, a drive shaft and the second shaft is a driven shaft. The first shaft extends into the first end of a first partial sleeve of a coupling means and the second shaft extends into a second end of a second partial sleeve of the coupling means, the coupling means being arranged between the two shafts. The coupling means has formed at each of its two ends pairs of diametrically opposed wedge-shaped catch slots, a first pair of the slots being arranged at the first end of the first sleeve and a second pair of the slots being arranged at the second end of the second sleeve. The slots extend in an axial direction in the coupling. The catch pins on the shafts protrude into the wedge-shaped catch slots of the coupling means. A spring which acts axially, in other words, is resilient in an axial direction, and is rigid in the direction of rotation is provided in the coupling means so that the wedge-shaped catch slots are pressed against the catch pins in the axial direction.

According to the invention, the catch pins of the driving shaft as well as the catch pins of the driven shaft are positioned in the wedge-shaped catch slots without play so that any rotational play is prevented, particularly when compensation is provided for possible axial movement.

In a particularly advantageous embodiment, the spring which acts axially is a metal bellows coupling that is connected in one piece at its opposite ends with both of the partial sleeves. The metal bellows coupling is very flexible in the axial direction and provides sufficient compensation for axial movement while it is rigid in the direction of rotation and enables torque to be transmitted without torsional play. A further advantage of the invention is that a metal bellows coupling when used as a transmission element provides compensation for any alignment errors between the two shafts. The metal bellows is preferably placed over a universal joint which is usually used for this purpose but which has torsional play.

A helical spring is preferably arranged between the end of the driving shaft and a stop in the interior of the partial sleeve at the driving side. The helical spring is in series with the metal bellows coupling that is arranged in rotationally rigid fashion between the partial sleeves. The helical spring presses the catch pin of the drive shaft into the catch slot of the partial sleeve at the drive side, enabling a relatively rigid and short-excursion resilience of the coupling means assembled to the driving shaft. Since the helical spring is arranged between the end of the driving shaft and a stop in the interior of the partial sleeve at the drive side, it operates axially in series with the metal bellows coupling, on one hand, and, on the other hand, is not loaded in the direction of rotation, especially since, as discussed above, it is not rigid in the direction of rotation.

It is particularly advantageous that the axial spring constant of the helical spring has a greater value than the axial spring constant of the metal bellows coupling. The axial resilience at the drive side thereby has a shorter excursion than the axial resilience at the driven side between the two partial sleeves. The helical spring behaves almost rigidly in comparison with the metal bellows coupling. The spring provides a particularly secure seating of the catch pin of the drive shaft in the catch slot of the partial sleeve at the drive side. This is because the axial force exerted by the helical spring is always greater than that exerted by the metal bellows coupling.

Preferably, a pair of wedge-shaped catch slots are provided in the sleeve-shaped end of the coupling means which points to the second shaft in which serves as an engagement end. The pair of wedge-shaped slots are open towards the open end of the sleeve and are for engaging the catch pin of the driven second shaft. The end of the driven shaft with its catch pins is easily guided into the engagement end.

In a particular construction, the wedge angle of the wedge-shaped catch slots has approximately the same value as the angle of friction between the catch pins and support surfaces of the wedges. In this way, the axial spring forces can be kept relatively small yet still hold the catch pins securely in the wedge-shaped slots and the catch pins can be detached again from the wedge-shaped slots without a great expenditure of force.

In a construction representing a further improvement, the end of the partial sleeve has a helical front surface that slopes towards the openings of the pair of catch slots. The catch pin of the shaft to be driven which has not been aligned with the catch slot pair of the partial sleeve in the engagement end can glide along this helical surface when the coupling means is rotated so that the engagement end finally springs onto the catch pin after a partial rotation of the coupling.

According to a second aspect of the invention, the object of the invention is solved by a detachable coupling means of the type described above which has a hub-type segment for one of the shafts and a sleeve-type segment for the other shaft in the coupling region of the two shafts. The hub-type segment of one shaft protrudes as a plug-in hub into the sleeve-type segment of the other shaft. A first freewheel and a second freewheel which is opposed to the first freewheel are integrated in the sleeve-type segment of the second shaft. These two freewheels mutually wedge with one another and form an extremely rigid connection which prevents any torsional play.

The coupling means usually has a detachment means for the relative rotation of one of the freewheels to the other freewheel. This can become necessary if, in the transmission of torque load shocks, for example, the connection wedges together so tightly that it can then be axially detached only with a great difficulty and the separation of the shafts without this detachment apparatus would then hardly be possible.

In a specific embodiment, the detachment apparatus for the relative rotation of the freewheels includes a sleeve-type segment formed from a first partial sleeve and a second partial sleeve wherein the first partial sleeve is mounted rotatably to the second partial sleeve and the two partial sleeves are connected via a resilient clamping of the first partial sleeve and the second partial sleeve. The clamp acts in the direction of rotation. The detachment means can be actuated preferably by means of a cam channel sleeve with a pressure plate that is mounted displaceably over the two partial sleeves. This makes it possible to couple the actuation of the detachment apparatus with the operating elements for the separation of the two shafts, such as by means of a linkage given a semi-automatic actuation. This means that a work step is saved.

BRIEF DESCRIPTION OF THE DRAWINGS

FIG. 3 is a side view, partially in cross section, of a preferred construction of the first embodiment of the invention;

FIG. 5 is a cross sectional view of a preferred construction of the second embodiment of the coupling according to the principles of the present invention;

FIG. 7 is a side view of the coupling of FIG. 5 showing the cam channel sleeve; and FIG. 8 is a side view of the cam channel sleeve of FIG. 7.

DETAILED DESCRIPTION OF THE PREFERRED EMBODIMENTS

Figure 1:
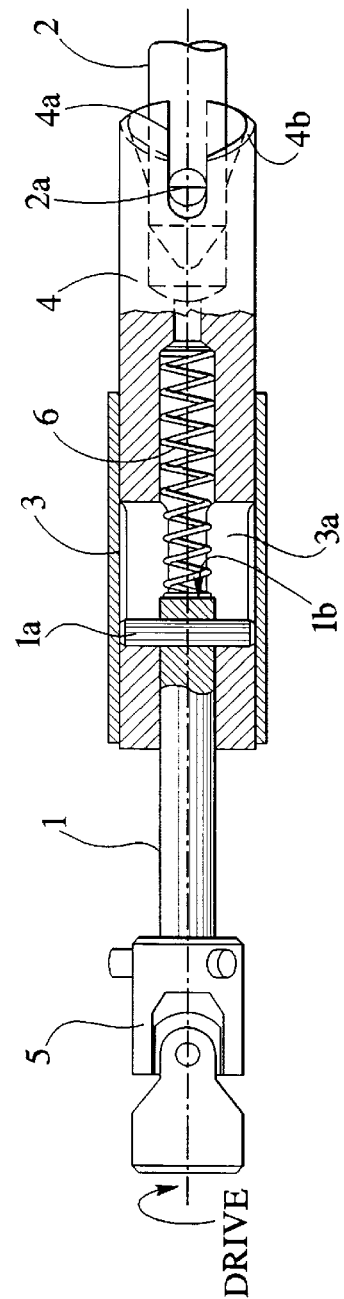
FIG. 1 is a side view, partially in cross section, of a coupling means according to the prior art.
Figure 2:
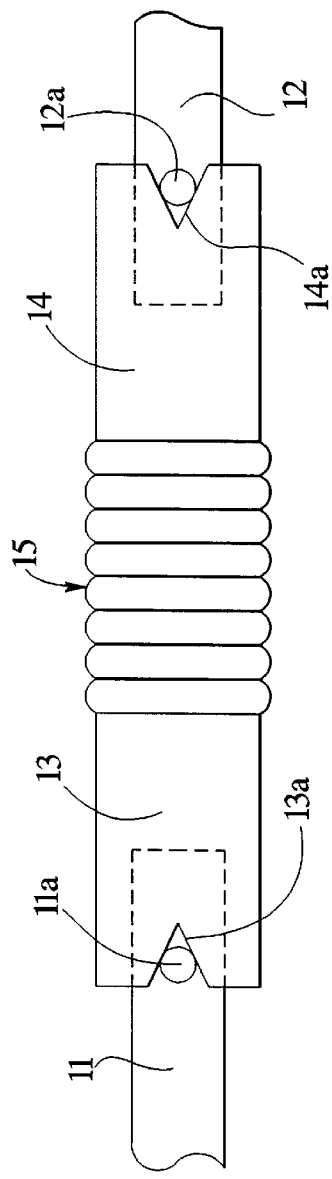
FIG. 2 is a side view of a coupling means according to a first embodiment of the present invention.

FIG. 2 illustrates a coupling means according to a first embodiment of the invention. The coupling means includes two partial sleeves 13 and 14 and a spring apparatus arranged between them, which is preferably in the form of a metal bellows coupling 15. A driving shaft 11 is provided with a diametrical catch pin 11a which protrudes into a wedge-shaped catch slot 13a of the partial sleeve 13 of the coupling means at a drive side. In a similar way, a driven shaft 12 with a diametrical catch pin 12a protrudes into a wedge-shaped catch slot 14a of the partial sleeve 14. Since the catch pins 11a and 12a are held without play in the catch slots 13a and 14a by the spring force of the spring device 15, the shafts 11 and 12 are connected by the coupling means without any torsional play. The spring device 15 is constructed in such a way that, on one hand, it operates resiliently in the axial direction and so provides length compensation while, on the other hand, it is rigid in the direction of rotation and allows no torsional play between the partial sleeves 13 and 14. In this way, a transmission of torques from the shaft 11 to the shaft 12 are possible without play in the direction of rotation.

In FIG. 3 is shown a preferred construction of a coupling according to this embodiment of the invention. A catch slot 14a is open in a wedge shape toward an end of a partial sleeve 14 which acts as an engagement end. The catch pin 12a always fits in the catch slot 14a without play. The shaft end 12b of the driven shaft 12 fits into a bore 14c in the partial sleeve 14 with little play. In this way, only a small alignment error is present between the engagement end of the sleeve 14 and the shaft end of the driving shaft 11. Any remaining small alignment errors between the driving shaft 11 and the driven shaft 12 are compensated by the metal bellows coupling 15. On the other hand, the metal bellows coupling 15 is torsionally rigid and allows no play in the direction of rotation. The bellows 15 provides an alignment compensation with a simultaneous length compensation between the partial sleeve. The partial sleeve 13 is connected to one side of the metal bellows coupling 15 opposite the sleeve 14. The sleeve 13 has a bore 13e in an end 13b into which a shaft end 11b of the driving shaft is inserted. A helical spring 16 is provided in the bore 13e bearing against the shaft end 11b at one end and a bottom 13c of the bore 13e at the other. The sleeve 13 has a longitudinal slot 13d with a wedge-shaped catch slot 13a at one end. The catch pin 11a can slide in the longitudinal slot 13d as needed, and while at the end having the catch slot it is fixed without play in the wedge-shaped catch slot 13a. The metal bellows coupling 15 has a spring force F5 as indicated by the arrows which is less than the spring force F6 of the helical spring 16 as indicated by corresponding arrows. It is thus ensured that both catch pins 11a and 12a always lie in the corresponding catch slots 13a and 14a without play.

A helical front surface 14b is provided on the end of the partial sleeve 14 so that when the coupling is rotationally advanced relative to the driven shaft 12 which has its catch pin 12a not in alignment with a catch slot 14a, the catch pin 12a slides on this helical front surface under the effect of the axial forces of the springs, up to and into the catch slot pair 14b so that the pin snaps into the slot.

The wedge angle of the wedge-shaped catch slots 13a and 14a is preferably of the order of magnitude of the angle of friction between the catch pin 11a and the support surfaces of the catch slot 13a as well as between the catch pin 12a and the support surfaces of the catch slot 14a. If the wedge angle is smaller than the angle of friction, the axial spring forces F5 and F6 required of the springs can be kept relatively small without the catch pins 11a and 12a being pushed out of their catch slots 13a or 14a by torques to be transmitted by the coupling. The lower limit of the wedge angle is reached when the self-locking effect is great enough that detachment of the coupling from the shafts is made difficult. If instead the wedge angle is made larger, the spring forces also have to be greater so as not to permit the pins to be pushed out of the wedge-shaped slots by the driving torques. The optimal angle of the wedge-shaped slots can thus be determined according to the demands of the torque to be transmitted and the desired axial compensation of a particular application.

Figure 4:
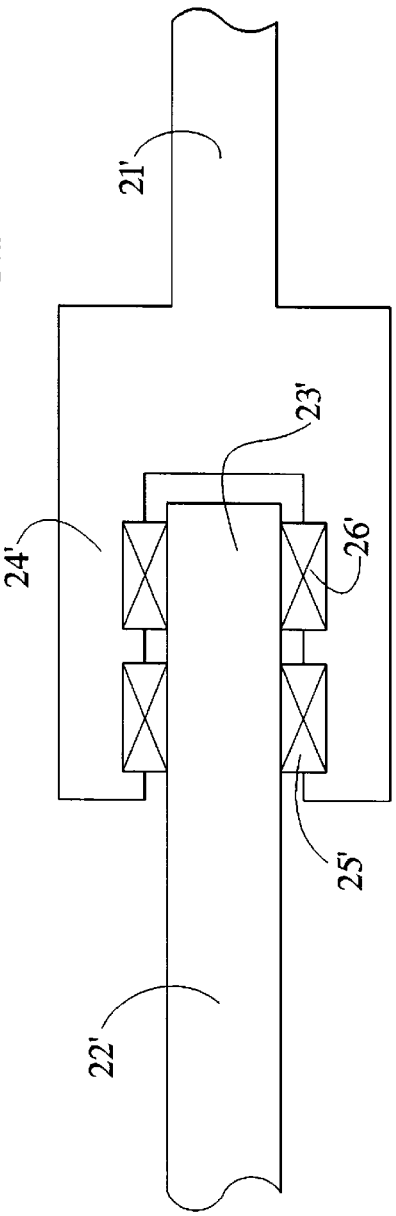
FIG. 4 is a schematic cross section of a coupling means according to a second embodiment of the present invention.

In FIG. 4 is shown a schematic illustration of a coupling arrangement according to the second embodiment of the invention. A first shaft 21' has a sleeve-type segment 24' in which two freewheels 25' and 26' are integrated, the freewheels acting in mutually opposite directions. A second shaft 22' has a hub-type segment 23' which can be plug into the freewheels 25' and 26' as a plug-in hub and can be removed therefrom. The opposed freewheels 25' and 26' operate tangentially to one another in a wedging fashion so that a connection that is rigid in the direction of rotation is achieved. Here as well, a transmission of torque without torsional play is enabled. It is not essential whether the shaft with the hub is the driving shaft or the shaft with the sleeve is the driving shaft.

A preferred construction of the second embodiment of the invention is shown in FIG. 5. In the illustration, a drive 21 which may be driven via gears that are not shown here drives the sleeve-type segment 24 in which the two opposed freewheels 25 and 26 are provided. A plug-in hub 23 protrudes into the freewheels 25 and 26 from the driven shaft 22 which extends through an opening in the housing 30 to a subassembly 31 to be driven. In the illustrated embodiment, the sleeve-type segment 24 of the drive is constructed with two partial sleeves 24a and 24b which are mounted rotatably to one another via a smooth bearing 24c.

During operation, the two partial sleeves 24a and 24b are connected with one another by means of a resilient bracing 29 that acts in the direction of rotation. For example, a plate spring may be provided. The tangential operating forces are designed to correspond to the torques to be transmitted. An additional sleeve extends over the two partial sleeves 24a and 24b, this additional sleeve being a cam channel sleeve 27 with a pressure plate 28. The two-part sleeve 24a and 24b, the smooth bearing 24c between the partial sleeves 24a and 24b, the plate spring 29, and the cam channel sleeve 27 with the pressure plate 28 form a detachment apparatus for causing the relative rotation of one freewheel against the other for detaching the subassembly. This detachment apparatus is particularly advantageous since, after the transmission of load shocks, the connection formed by the freewheels 25 and 26 that act in mutually opposite directions is then axially detachable without difficulty. The actuation of the detachment apparatus is affected by extending a force F on the pressure plate 28. The force F rotates the two snug freewheels 25 and 26 against one another via the cam channel sleeve 27. The actuation may take place semi-automatically via an operating element that is to be actuated by the user for the detachment of the subassembly 31. For example, a handle (not shown) which acts on the detachment apparatus via a linkage or the like may be provided.

Figure 6:
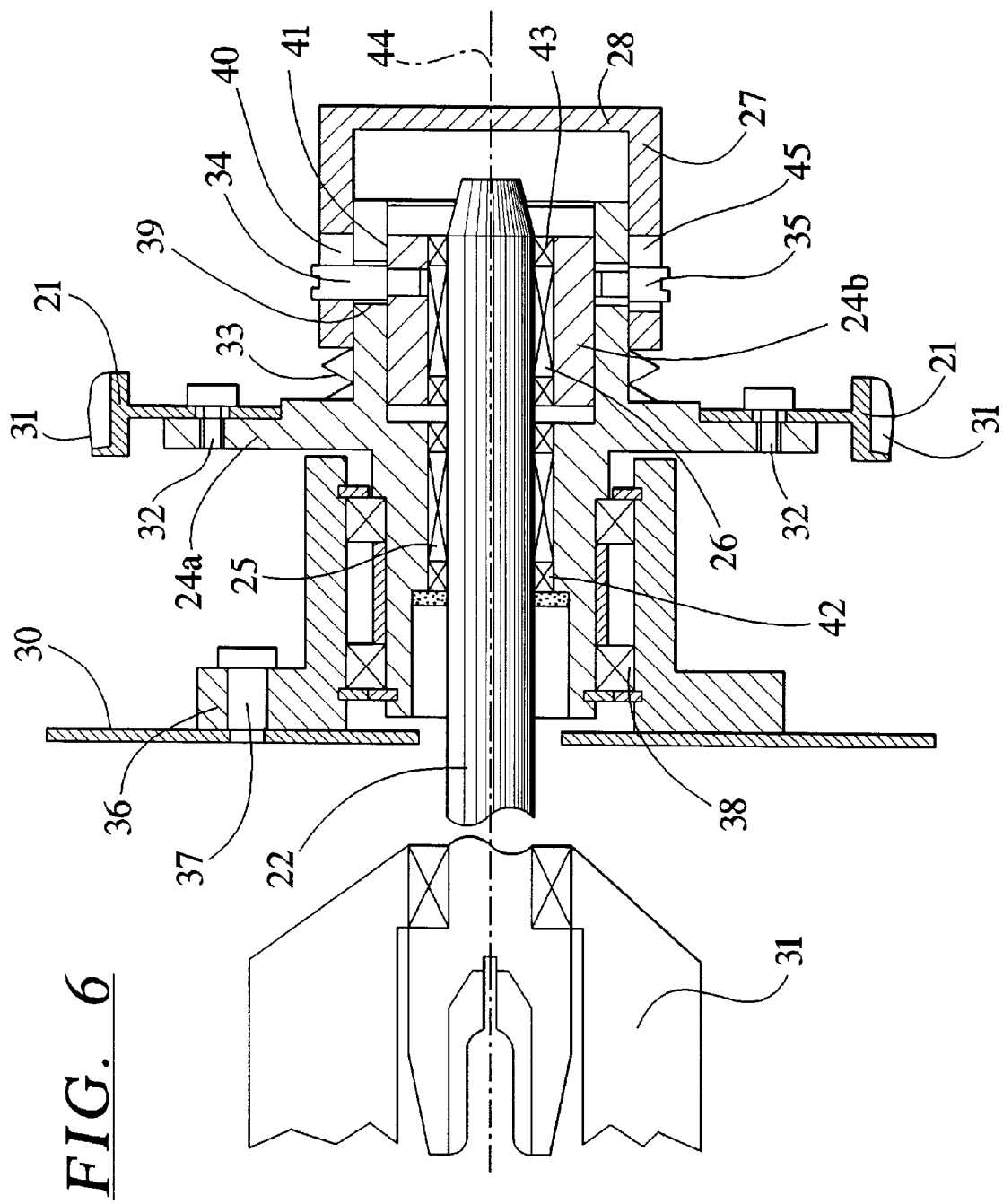
FIG. 6 is a cross sectional view of the embodiment of FIG. 5 shown in detail.

In FIG. 6, the embodiment of FIG. 5 is shown in more detail. Rolling bearings 42 are located besides the freewheel 25. Rolling bearings 43 are located besides the freewheel 26 which are bearing on the shaft 22. Thereby, the shaft 22 is guided exactly when it is being driven by the driving wheel 21 of a driving system. The driving system further comprises a stepping motor (not shown) which drives the driving wheel 21 via a friction belt 31. The driving wheel 21 is fixed on the sleeve 24a by a screw 32.

The driving system may rotate the shaft 22 clockwise or counter clockwise around the shaft axis 44. By driving the shaft 22 in one particular direction, e.g. clockwise, a driving force will be transmitted from the wheel 21 via the sleeve 24a and the freewheel 25 onto the shaft 22. By driving the shaft 22 in the opposite direction, i.e. counter clockwise in this example, a driving force will be transmitted via the sleeve 24a, the sleeve 24b and the freewheel 26 onto the shaft 22.

In a first operational mode, it is possible to insert a shaft 22 into the coupling system. In this mode it is also possible to change between a first shaft 22 and a second shaft. In this mode, the freewheels 25 and 26 are released from the shaft 22. For such a release, the pressure plate 28 and the cam channel sleeve 27 are pressed along axis 44 towards the freewheels 25 and 26. A first screw pin 34 is hereby rotated around the axis 44 and guided by a hole 40 of the cam channel sleeve 27 (see also FIG. 7). Further, the cam channel sleeve 27 is guided by a screw pin 35 and a guiding hole 45. Screw pin 34 is fixed at the sleeve 24b but may move within the sleeve 24a. Within a guiding hole 39, the sleeve 24b follows the rotational movement of the screw pins 34 and 35. Hereby, the sleeve 24b rotates within the sleeve 24a in a frictional manner by a plain bearing 41. As a result, one of the freewheels, e.g. freewheel 26, releases its clamping hold from shaft 22. In that stage of operation, the shaft 22 is further clamped by the other freewheel 25 and does not follow any rotational movement since the driving means 21 are not in operation.

Having been released from one of the freewheels, the shaft 22 may be manually rotated in a counter rotational direction and thereby released from the other freewheel, too. Afterwards, the shaft 22 may be easily taken out from the driving assembly.

In a second mode of operation, both of the freewheels 25 and 26 clamp the shaft 22. Such clamping is performed as follows. While pressing the pressure plate 28 and the cam channel sleeve 27 along the axis 44 towards the freewheels 25 and 26, the shaft 22 is inserted into the driving assembly protruding into the freewheels 26 and 26. Then the pressure against pressure plate 28 is released and disk springs 33 force the cam channel sleeve 27 to move away from the freewheels 25 and 26 along the axis 44. Thereby, the screw pins 34 and 35 are guided by the guiding holes 40 and 45 and turned around the axis 44 (see also FIGS. 7 and 8). Thereby, both of the screw pins 34 and 35 force the sleeve 24b to rotate within the sleeve 24a around the axis 44 in such a manner that the freewheel 26 locks and clamps the shaft 22. As a result, the shaft 22 is coupled to the driving wheel 21 for rotational movement without any free motion.

At the housing 30 of a machine, which may be an electrophotographic printer or a part of an electrophotographic printer, the driving assembly is mounted by screws 37 and via a flange 36. Further, the sleeve 24 of the driving assembly is rotationally carried at the flange 36 via bearings 38.

For constructing the coupling of the invention, any freewheels that known in the art may be used so long as they meet conform to the appropriate dimensions and quality standards. For example, those known by part number HFL 0822 KF which are available from INA Waelzlager Schaeffler KG, 91072 Herzogenaurch, Germany may be chosen for applications within electrophotographic printers. However, other manufacturers or types of friction wheels may as well be appropriate for that purpose, as well.

Thus, the present invention provides a detachable coupling for transmitting mechanical rotation forces from the driving shaft to the driven shaft which extends as an elongation of the driving shaft. The spring apparatus is provided in the coupling which acts axially and is rigid in the direction of rotation and which presses the wedge-shaped catch slots of the coupling apparatus in the axial direction against the catch pins of the shafts.

Although other modifications and changes may be suggested by those skilled in the art, it is the intention of the inventors to embody within the patent warranted hereon all changes and modifications as reasonably and properly come within the scope of their contribution to the art.

We claim:

1. A detachable coupling apparatus for transmitting mechanical rotational power from a driving portion to a driven portion extending substantially along a common axis, comprising:

a coupling region of said driving portion and said driven portion including a hub-type segment, a sleeve-type segment into which said hub-type segment protrudes as a plug-in hub, a first freewheel integrated in said sleeve-type segment, and a second freewheel acting opposed to said first freewheel, said first and second freewheels effecting a coupling between said hub-type segment and said sleeve-type segment; and a release mechanism for rotation of said first freewheel and said second freewheel relative to one another.

2. A detachable coupling apparatus as claimed in claim 1, further comprising:

a detachment apparatus for rotating said first freewheel and said second freewheel relative to one another.

3. A detachable coupling apparatus as claimed in claim 2, wherein said sleeve-type segment includes:

a first partial sleeve, a second partial sleeve, a bearing mounting said first partial sleeve rotatably to said second partial sleeve, and a resilient bracing connecting said first partial sleeve to said second partial sleeve, said resilient bracing being resilient in a direction of rotation.

4. A detachable coupling apparatus as claimed in claim 3, further comprising:

a cam channel sleeve and a pressure plate on said cam channel sleeve mounted to actuate said detachment means, said cam channel sleeve being movable over said first and second partial sleeves.

* * * * *